United States Patent [19]

Schmit et al.

[11] 3,971,921

[45] July 27, 1976

[54] APPARATUS FOR DISTINGUISHING TIME VARYING ANALOG SIGNALS

[75] Inventors: David E. Schmit; Frank L. Wedig, Jr., both of Cincinnati, Ohio

[73] Assignee: Cincinnati Electronics Corporation, Cincinnati, Ohio

[22] Filed: Jan. 13, 1975

[21] Appl. No.: 540,604

[52] U.S. Cl. .......................... 235/151.35; 328/147; 340/146.2; 356/83
[51] Int. Cl.² .......................... G01J 3/42; G01J 3/08
[58] Field of Search .................. 235/151.3, 151.35; 356/83, 96; 340/146.2; 328/146, 147, 150, 151

[56] References Cited
UNITED STATES PATENTS

| | | | |
|---|---|---|---|
| 3,561,872 | 2/1971 | Grabowski et al. | 356/83 |
| 3,820,898 | 6/1974 | Olson | 356/83 |
| 3,868,499 | 2/1975 | Aaronson et al. | 235/151.35 |

*Primary Examiner*—Felix D. Gruber
*Attorney, Agent, or Firm*—Lowe, King, Price & Markva

[57] ABSTRACT

An optical scanner having a narrow instantaneous field of view optically scans an entire field of view to determine if a particular source of optical radiation is in the field of view. A first detector responds to energy of a source imaged by the scanner and derives a first signal having an amplitude versus time variation that is a convolution of dispersed spectral energy from the source. A second detector, displaced by a predetermined distance from the first detector, responds to substantially only one predetermined wavelength of the energy of the imaged source. In response to the energy from the second detector being above a predetermined amplitude, a waveform recognition network responsive to the first signal is enabled. The recognition network includes a circuit for detecting the amplitude of the peak value of an initial undulation of the first signal. In response to the detected peak being above a threshold value, the amplitude of the first signal is compared at a plurality of different time intervals following the initial peak with predetermined maximum and minimum percentages of the detected peak value. In response to the first signal falling between the maximum and minimum values during at least some of the different time intervals, a signal is derived to indicate that the particular source of optical radiation has been detected.

12 Claims, 4 Drawing Figures

APPARATUS FOR DISTINGUISHING TIME VARYING ANALOG SIGNALS

FIELD OF INVENTION

The present invention relates generally to apparatus for enabling time varying analog signals to be recognized and, more particularly, to an apparatus wherein detected energy triggers a comparison means responsive to a percentage of a peak value of an initial undulation of an analog signal and subsequent values of the analog signal.

BACKGROUND OF THE INVENTION

In the copending, commonly assigned application Ser. No. 540,531 entitled "Scanning Optical Spectral Analyzer Employing Plural Detectors" of Dapper et al., there is disclosed a device wherein a field of view is scanned to determine spectral information of a point source of optical radiation. First and second displaced optical detector means for imaged radiation from a point source being monitored are respectively provided in first and second optical paths that are substantially simultaneously established with a scanner having an instantaneous narrow field of view. In the second optical path, a narrow bandpass filter is provided to establish a reference time position for a predetermined wavelength of the source. In the first optical path, a dispersion means, such as a prism, is provided so that different wavelengths of the source are convoluted onto the first detector means at different times during a scan of the field of view. The convoluted wavelengths cause the first detector means to derive a time varying analog signal having a predetermined waveform including an initial peak value followed by a predetermined time varying undulation. The undulation is indicative of the spectral properties of the imaged point source and enables different sources to be distinguished from each other.

A problem in recognizing the undulations of different point sources is that the occurrence time of the first peak is unpredictable, as the source has a random position anywhere in the field of view. Also, the amplitude of the undulations has a tendency to vary depending upon the distance between the point source and the detector, even though the shape of the waveform remains relatively constant for a particular point source.

It is, therefore, an object of the present invention to provide a new and improved apparatus for distinguishing different time varying analog signal sources and enabling signal sources having predetermined waveform characteristics to be determined.

Another object of the present invention is to provide a new and improved apparatus for enabling a particular source of optical radiation in a field of view being scanned by an optical scanner to be distinguished from other sources of optical radiation.

A further object of the invention is to provide a correlator for distinguishing different point source optical images resulting from a convolution of dispersed optical energy from the source.

An additional object of the invention is to provide an apparatus for enabling a particular source of optical radiation in a field of view being scanned by an optical scanner to be distinguished from other sources of optical radiation even though the position of the source is random.

A further object of the invention is to provide a new and improved waveform recognition system wherein wave shape variations are matched, even though there is an appreciable variation in the amplitude of a signal comprising the variations.

BRIEF DESCRIPTION OF THE INVENTION

In accordance with the present invention, there is provided a new and improved waveform recognition network particularly adapted to be used with the device disclosed in the previously mentioned copending application to enable a particular point source of radiation in a scanned field of view to be distinguished from other sources of radiation in the field of view. The regcognition network is normally not responsive to the convoluted, dispersed spectral energy of the first detector, but is enabled only in response to monochromatic energy imaged on the second detector being above a predetermined threshold value. In response to the monochromatic energy being above the predetermined threshold value, a time base of the recognition network is effectively established. Once activated, the recognition network is able to distinguish a particular point source of optical radiation in a field of view from other point sources by comparing the shape, rather than amplitude, of a signal resulting from a convolution of the dispersed energy. This is possible by determining the amplitude of an initial peak of the convoluted energy and comparing the amplitude of subsequent undulations of the signal with predetermined maximum and minimum percentages of the initial peak value. In response to the amplitude of the subsequent undulations falling between the minimum and maximum percentages of the initial peak, an indication is provided that the first signal is representative of a particular source of interest. By comparing percentages of the initial peak values with the magnitude of the subsequent variations, the recognition network is relatively immune to variations in the intensity of the radiation imaged on the detectors, whereby sources at different ranges from the detector are easily distinguished.

A further time base is provided in accordance with a preferred embodiment of the invention by activating the comparison means only a predetermined time interval after an initial peak value above a threshold has been detected. In an optical scanning system, wherein the location of an optical source in the field of view is subject to random variations, the initial peak value does not have a predetermined occurrence time. Thereby, it is necessary to establish time positions for the comparison with respect to the occurrence time of the initial peak value.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

Figure 1:
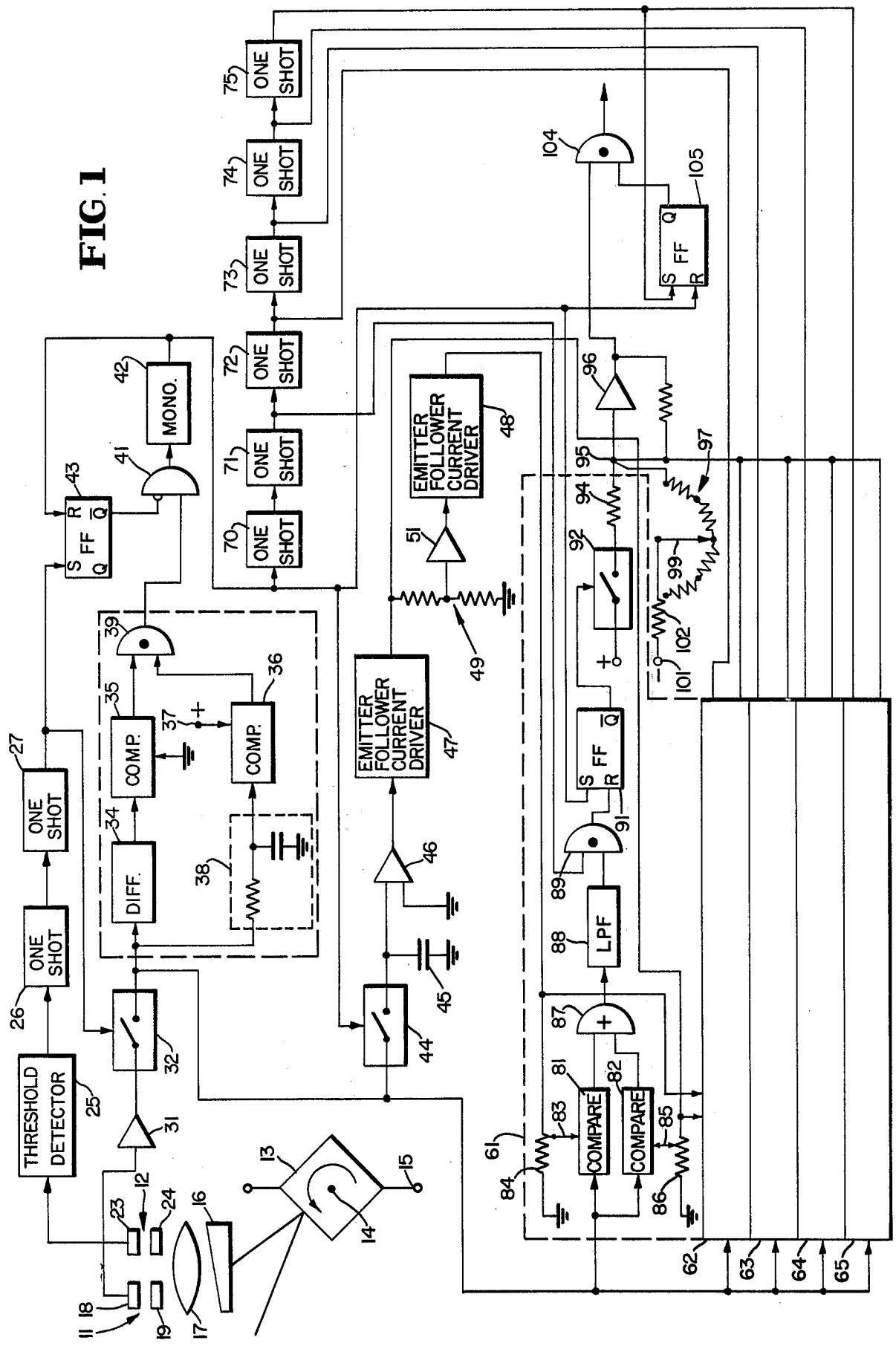
FIG. 1 is a schematic, block diagram of a preferred embodiment of the invention.

Reference is now made to FIG. 1 of the drawing wherein there are illustrated a pair of optical systems 11 and 12 for orthogonally scanning a relatively wide field of view. Systems 11 and 12 have radiation patterns with narrow instantaneous fields of view that are simultaneously responsive to substantially the same optical images at any instant of time. To cover the entire relatively wide field of view, optical systems 11 and 12 are scanned together in elevation and azimuth by rotating reflecting cube 13, having four mutually orthogonal planar reflecting faces, about horizontal and vertical axes 14 and 15. Rotation about axis 14 is considerably faster than about axis 15 whereby elevation scanning is considerably faster than azimuth scanning. Each of optical systems 11 and 12, in addition to including a common reflecting face of cube 13, includes as common elements dispersion prism 16 and focusing lens 17.

Figure 2A:
FIGS. 2A–2C are waveforms helpful in describing the operation of the apparatus of FIG. 1.
Figure 2B:
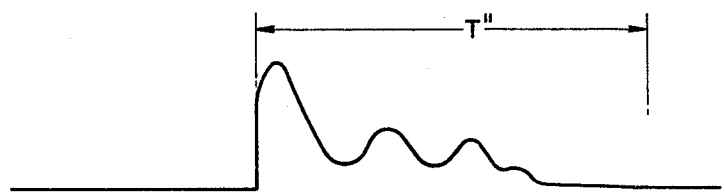

Optical system 11 includes a photodetector 18 which is responsive to optical energy transmitted through relatively broad band optical filter 19 that is responsive to energy coupled through lens 17. The pass band of filter 19 is sufficient to enable virtually all of the energy of any point source of interest in the field of view to be coupled to photodetector 18. Optical system 12 includes a second photodetector 23 that is responsive to energy of substantially only one wavelength, as coupled to it by monochromatic filter 24 that is responsive to energy passed through lens 17. Thereby, in response to a predetermined wavelength being in the instantaneous field of view of optical system 12, a relatively short duration pulse is derived from photodetector 23, as illustrated in FIG. 2A. In contrast, photodetector 18 derives a time varying analog waveform having an initial undulation having a peak value, and subsequent time varying amplitude undulations, as illustrated in FIG. 2B. The time position and amplitude of the subsequent undulations relative to the peak of the initial undulation derived from photodetector 18 is characteristic of different point sources that exist in a field of view being scanned and enable different point sources to be distinguished from each other. The output of photodetector 18 has a waveform representing the convoluted, dispersed optical radiation of a point source imaged on the photodetector. This waveform represents the amplitude vs. wavelength variations of the imaged source, where time position of the waveform from the occurrence time of the monochromatic energy output of photodetector 23 represents wavelength.

The relatively short duration pulse of FIG. 2A, as derived from photodetector 23, always occurs before the leading edge of the initial undulation of the analog waveform of FIG. 2B, as derived from photodetector 18. This is because of the rotational direction of prism 13 about axis 14, as well as the relative positions of spatially displaced photodetectors 18 and 23 and the orientation of the wedge forming dispersion prism 16.

The apparatus of the present invention includes a waveform recognition network for distinguishing one particular output waveform of photodetector 18, associated with a point source of interest, from other waveforms that are generated by photodetector 18 in response to other point sources being imaged on the photodetector. The recognition network is activated in response to the output pulse of photodetector 23 exceeding a predetermined threshold value.

To these ends, the output of photodetector 23 is applied to threshold detector 25, having an output which is connected to one input of one-shot multivibrator 26. In response to the threshold level of detector 25 being exceeded by the amplitude of the output signal of photodetector 23, the threshold detector derives a binary one signal. The binary one signal subsists as long as the output of photodetector 23 is above the threshold level, which is generally a relatively short interval for point sources. In response to the binary one output of threshold detector 25, one-shot multivibrator 26 derives a binary one level having a duration approximately equal to the expected time separation of the monochromatic energy pulse output from a particular point source imaged on photodetector 23 and the leading edge of the initial undulation of the output of photodetector 18 that occurs in response to the convolution of that point source on photodetector 18, as indicated by the time interval T', FIG. 2A. Connected to the output of one-shot multivibrator 26 is a further one-shot multivibrator 27 that is activated to a binary one state in response to the trailing edge of the output of one-shot 26. One-shot 27 derives a binaary one level having a duration equal to the active time of the recognition network (indicated in FIG. 2B by the time interval T''), i.e., the interval between the leading edge of the initial undulation of the output of photodetector 18 and a predetermined later time when all of the subsequent undulations resulting from the convolution of a particular point source of interest are known to have terminated.

The time varying analog output signal of photodetector 18 is coupled to an input terminal of isolation amplifier 31. The output of amplifier 31 is coupled to normally open-circuited switch 32 that is activated to a closed state in response to a binary one output of one-shot 27. Thereby, switch 32 is closed for the duration of one-shot 27 being in a binary one state, to enable the dispersed, convoluted energy detected by photodetector 18 to be coupled to the remainder of the recognition network.

The occurrence of peak value of the initial undulation in the output of photodetector 18 is detected by sensing the substantially simultaneous occurrence of a zero slope and a value greater than a threshold value of the waveform passed through switch 32. To these ends, the output of switch 32 is coupled to differentiator 34 which drives comparator 35 that is also responsive to ground, i.e., zero, potential. Thereby, comparator 35 derives a binary one output pulse in response to differentiator 34 indicating that the slope of its input is zero. The output signal of switch 32 is also applied to comparator 36 that determines if the threshold has been exceeded by being connected to a predetermined, positive D.C. reference voltage at terminal 37; in response to the input of comparator 37 exceeding the voltage at terminal 37, the comparator derives a binary one pulse. Connected between the input of comparator 36 and the output of switch 32 is a low pass filter or delay circuit 38 which stretches the output of photodetector 18 for a sufficient time to permit coincidence in the binary one outputs of comparators 35 and 36. The output pulses of comparators 35 and 36 are applied to AND gate 39 which derives a binary one signal only in response to the threshold of comparator 36 being exceeded while a zero slope is detected by differentiator 34 and comparator 35. AND gate 39 derives a binary one pulse for a relatively short duration; the trailing edge of this pulse can be thought of as a waveform recognition network trigger signal.

Figure 2C:
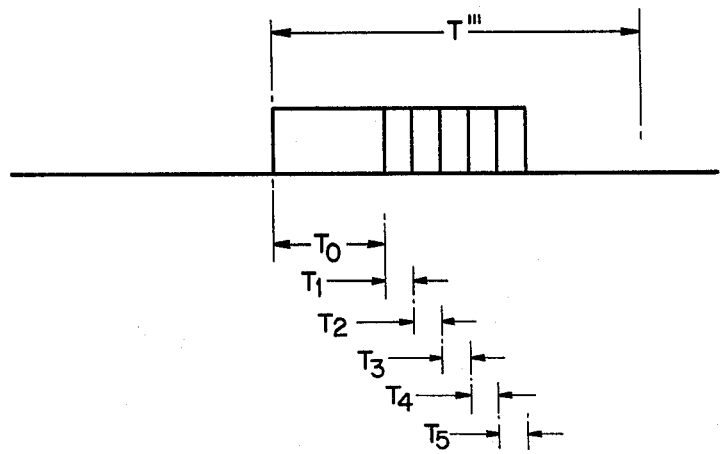

The recognition network trigger signal is selectively gated through inhibit circuit 41 to an input of monostable multivibrator 42. Inhibit circuit 41 includes an inhibit input terminal responsive to a complementary ($\overline{Q}$) output of flip-flop 43, that is in turn activated into the set state in response to the leading edge of the output of one-shot 27. Thereby, in response to the output of AND gate 39 that occurs in response to the peak value of the initial undulation of the output of photodetector 18, inhibit gate 41 is not inhibited and monostable multivibrator 42 is activated into the binary one state in response to the trailing edge of the AND gate output. Monostable multivibrator 42 stays in the binary one state for a predetermined time duration approximately equal to the activation time of the recognition network; multivibrator 42 is always triggered into the binary one state at the beginning of the interval T''', FIG. 2C, (which is in substantial time coincidence with the peak value of the first undulation) and ends approximately at the end of the T'' interval, when one-shot 27 returns to a zero state at a time when the signal variation derived from detector 18 has terminated for all expected radiation sources (whether point sources or non-point sources) in the field of view. The output of monostable multivibrator 42 is applied to a reset input of flip-flop 43, causing inhibit gate 41 to block outputs of AND gate 39 throughout the rest of the time that the recognition network is activated to be responsive to the convoluted energy of the point source which resulted in the output pulse of FIG. 2A. Thereby only the peak value of the initial undulation can activate the recognition network The amplitude of the subsequent undulations of the output of photodetector 18 are compared at one or more different times with the amplitude of the peak value of the initial undulation. To determine the amplitude of the peak value of the initial undulation, the output singal of switch 32 is coupled through normally closed switch 44 to shunt capacitor 45 which is connected across the input terminals of high input impedance, isolating amplifier 46. Thereby, capacitor 45 is charged by a voltage replica of the analog signal derived from photodetector 18 and follows all of the variations of the signal coupled through switch 32 as long as switch 44 is closed. Switch 44 is open-circuited in response to monostable multivibrator 42 being in a binary one state, whereby switch 44 is opened immediately after the occurrence of the peak value of the initial undulation has been detected. Capacitor 45 stores the peak value of the initial undulation for the duration of the time that the recognition network is activated in response to the output signal of photodetector 23.

The voltage stored on capacitor 45 is applied by amplifier 46 to emitter follower current driver 47, which drives a second emitter follower current driver 48 via a voltage divider 49 and isolating amplifier 51. Voltage divider 49 reduces the input voltage to current driver 48 relative to the voltage applied to current driver 47. Both of current drivers 47 and 48 derive output currents that are directly proportional to the amplitude of the voltages applied to the inputs thereof. Current drivers 47 and 48 derive currents that are supplied to comparators for determining if the amplitude of the output of photodetector 18 is between predetermined maximum and minimum values at a plurality of time intervals after the detected peak value of the initial undulation. To determine if the output of photodetector 18 at the plural subsequent intervals falls between the minimum and maximum values, five substantially identical, sequentially activated channels 61–65 are provided.

To activate channels 61–65 in sequence at different time intervals occurring subsequent to the detected initial peak, six cascaded one-shot multivibrators 70–75 are provided. One-shot multivibrator 70 is responsive to the leading edge of the output of monostable multivibrator 42. One-shot multivibrator 70 includes circuitry for deriving a binary one level for a period, indicated by $T_0$, FIG. 2C, that extends between the detected initial peak and the time when the subsequent undulation of the output of photodetector 18 for a point source of interest has a relatively high value. One-shot multivibrator 70 is interposed between the output of monostable multivibrator 42 and the input of one-shot multivibrator 71 to disable all of channels 61–65 during the period $T_0$ when the initial undulation of the output of photodetector 18 is decreasing toward zero and subsequent thereto while the output of the photodetector is increasing to an appreciable, detectable value; disabling of channels 61–65 occurs during the period $T_0$ since none of multivibrators 71–75 can be activated into the binary one state while multivibrator 70 is in the one state.

Each of one-shot multivibrators 71–75 includes circuitry for deriving time adjacent, relatively short duration binary one levels; each of the durations is generally the same. The activation times of one-shot multivibrators 71–75 are respectively indicated in FIG. 2C as $T_1 - T_5$. During the sequential intervals $T_1 - T_5$, channels 61–65 are sequentially activated to be responsive to the signal coupled through switch 32. To provide for sequential activation of one-shot multivibrators 71–75, the input circuit of each is responsive to the trailing edge of the preceding multivibrator. The binary one level derived from one-shot multivibrator 71, during the interval $T_1$, is applied as an enable input to channel 61. Similarly, each of channels 62–65 is enabled in response to the output signals of one-shot multivibrators 72–75.

Since each of channels 61–65 is substantially the same, a description of channel 61 suffices for all five. Channel 61 includes a pair of comparators 81 and 82 driven in parallel by the signal coupled through switch 32. Comparators 81 and 82 are responsive to different predetermined, nonzero percentages of the peak amplitude of the initial peak output of photodetector 18, as stored on capacitor 45. Comparator 81 includes a second input that is responsive to the voltage at tap 83 of potentiometer 84 which is responsive to the output of emitter follower current driver 48. Comparator 82 is connected to be responsive to the voltage derived at tap 85 of potentiometer 86 that is connected to be responsive to the output of emitter follower current driver 47. In response to the input to comparator 81 from switch 32 being above a threshold value established by the voltage at tap 83, a binary zero output is derived by the comparator. In contrast, comparator 82 derives a binary zero signal in response to the voltage applied to it by switch 32 being below the threshold voltage established by tap 85. Thereby, comparator 81 can be considered as a low voltage comparator, while comparator 82 can be considered as a high voltage comparator. Potentiometer 84, connected to the low voltage comparator, is responsive to the reduced output current of driver 48, rather than being driven by driver 47, to provide greater accuracy in setting the position of potentiometer 84 for the low voltage range.

To indicate that the voltage applied to channel 61 by switch 32 is in the range between the upper and lower percentages established by the threshold input to comparators 81 and 82, the output signals of comparators 81 and 82 are applied to OR gate 87. OR gate 87 derives a binary zero output only in response to the signal input to channel 61 being between the upper and lower thresholds applied to comparators 81 and 82. If there should be a momentary, short duration noise spike at the output of switch 32, causing a binary one to be momentarily derived from either of comparators 81 or 82 and a resulting momentary binary one output of OR gate 87, it is eliminated by low pass filter 88 that is responsive to the output of the OR gate.

The output of low pass filter 88 is sampled for the period $T_1$ to determine if the signal coupled through switch 32 during the period $T_1$ falls between the upper and lower percentages of the peak value of the initial undulation established by the voltages at taps 85 and 83. To these ends, AND gate 89 is provided and is connected to the output of one-shot multivibrator 71 so that the AND gate is enabled in response to the one-shot being in a binary one state. AND gate 89 is also responsive to the output of low pass filter 88, whereby the AND gate 89 derives a binary one signal only in response to the amplitude of the output of photodetector 18 being outside of the region between the threshold voltages applied to comparators 81 and 82 during the interval $T_1$.

The output of AND gate 89 is coupled to a reset input of flip-flop 91, having a set input that is responsive to the leading edge of the output of monostable 42. Flip-flop 91 includes a complementary ($\overline{Q}$) output which controls activation of normally open-circuited switch 92. In response to flip-flop 91 being activated to the reset state, whereby a binary one level is derived from its $\overline{Q}$ output terminal, switch 92 is closed to couple a predetermined, positive voltage at terminal 93 to resistor 94, that is connected to node 95. Thereby, resistor 94 supplies a predetermined, non-zero current to node 95 only if during time $T_1$ the amplitude of the signal coupled through switch 32 does not fall within predetermined maximum and minimum percentages of the peak value of the initial undulation of the output of photodetector 18; if the signal amplitude falls between the percentages no current is supplied by resistor 94 to node 95. Each of channels 62-65 is similar to channel 61 and respectively supplies the same predetermined current to node 95 during intervals $T_2 - T_5$ in response to the output signals of one-shot multivibrators 72-75 if the signal amplitudes derived from photodetector 18 during those intervals fall outside of the thresholds established by the high and low voltage comparators of channels 62-65.

Operational amplifier 96, in addition to being responsive to the outputs of channels 61-65, is responsive to one of five different predetermined negative voltages, as coupled to it from multitap potentiometer 97. Potentiometer 97 includes a slider 99 that is detented to one of the five taps of the potentiometer and is connected through resistor 102 to a negative D.C. power supply voltage at terminal 101. One end of potentiometer 97 is unconnected, while the other end is connected to node 95. Amplifier 96 responds to the voltages applied to node 95 to selectively derive a binary one signal in response to the net input voltage to node 95 being negative. By positioning slider 99 on different ones of the taps of potentiometer 97, amplifier 96 is effectively programmed to respond to any number of the five output signals of channels 61-65; i.e., a binary one signal can be derived from amplifier 96 in response to one, two, three, four or five of channels 61-65 being responsive to signals having amplitudes that are between the minimum and maximum percentages of the peak value of the initial undulation.

To sample the output of amplifier 96 in the interval between the end of sample time $T_5$ and when the waveform recognition network is disabled, at the end of interval $T'''$, the output signal of amplifier 96 is gated through AND gate 104. AND gate 104 is enabled in response to the principal output of flip-flop 105. Flip-flop 105 has a set input responsive to the output of one-shot multivibrator 75 and a reset input responsive to the output of monostable multivibrator 42. Thereby, flip-flop 105 is activated to the set state and a binary one output is derived from the principal output terminal of flip-flop 105 only in the interval between the end of sample time $T_5$ and the completion of the $T'''$ interval. If amplifier 96 derives a binary one signal during this interval, an indication is derived that the undulations of the output of photodetector 18 subsequent to the initial undulation peak represent the amplitude vs. spectral response of a desired point source to the exclusion of undesired point sources.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. Apparatus for scanning a field of view and enabling a particular source of optical radiation in the field of view to be distinguished from other sources of optical radiation comprising means having a narrow instantaneous field of view for optically scanning the field of view, detector means responsive to energy of the source imaged by the scanning means for deriving an analog signal having an amplitude versus time variation that is a convolution of dispersed spectral energy from the source while the field of view is being scanned, a waveform recognition network selectively responsive to the analog signal, means for enabling the network in response to the scanning, said network including means for detecting the peak amplitude value of an initial undulation of the analog signal, means for comparing a value of the analog signal occurring a predetermined time subsequent to enabling of the network with a predetermined percentage of the detected peak amplitude value, and means responsive to the comparing means for signalling the presence of the particular source in the field of view.

2. The apparatus of claim 1 wherein the means for detecting the peak amplitude value includes a storage capacitor selectively connected to be charged by a voltage replica of the analog signal, means for detecting the occurrence of the peak amplitude of the initial undulation, and means for decoupling the storage capacitor from the voltage replica of the analog signal in response to the peak amplitude of the initial undulation until the signal variation derived by the energy responsive detector means for a particular optical radiation source has terminated.

3. The apparatus of claim 2 further including means for effectively preventing detection of peak amplitudes of undulations subsequent to the initial undulation.

4. The apparatus of claim 1 further including timing means responsive to the means for detecting the peak occurrence, said timing means including means for deriving a number of time spaced signals occurring after the detected peak, and wherein the means for comparing includes means responsive to the time spaced signals for comparing the waveform magnitude at a plurality of different displaced times following the occurrence time of the peak of the initial undulation, and the means for indicating includes means responsive to comparisons at a plurality of different displaced times.

5. The apparatus of claim 1 wherein the means for comparing includes means for comparing the waveform magnitude at a plurality of different displaced times following the occurrence time of the initial peak, and the means for indicating includes means responsive to the comparisons at at least some of the plural different displaced times.

6. The apparatus of claim 5 wherein the means for comparing includes means responsive to the detected peak amplitude value for deriving first and second non-zero threshold signals having values that are different percentages of the detected peak amplitude value, and means for signalling the presence of the particular source only in response to the analog signal having a value between the values of first and second threshold signals.

7. The apparatus of claim 1 wherein the means for comparing includes means responsive to the detected peak amplitude value for deriving first and second non-zero threshold signals having values that are different percentages of the detected peak amplitude value, and means for signalling the presence of the particular source only in response to the analog signal having a value between the values of first and second threshold signals.

8. Apparatus for scanning a field of view and enabling a particular source of optical radiation in the field of view to be distinguished from other sources of optical radiation comprising means having a narrow instantaneous field of view for optically scanning the field of view, first detector means responsive to energy of the source imaged by the scanning means for deriving a first analog signal having an amplitude versus time variation that is a convolution of dispersed spectral energy from the source while the field of view is being scanned, second detector means displaced by a predetermined distance from the first detector means, said second detector means being responsive to substantially only one predetermined wavelength of energy of the source imaged by the scanning means, means responsive to the second detector means being responsive to energy above a predetermined amplitude for enabling a waveform recognition network responsive to the first signal, said network including means for detecting the peak amplitude value of an initial undulation of the first signal, means for comparing a value of the first signal occurring a predetermined time subsequent to the peak amplitude value with a predetermined percentage of the detected peak amplitude value, and means responsive to the comparing means indicating that the first signal at the predetermined time has an amplitude in excess of the predetermined percentage for signalling the presence of the particular source.

9. Apparatus for determining if a time varying analog signal has a predetermined waveform, said predetermined waveform including an initial undulation having a peak value followed by a predetermined variation, said predetermined variation occurring a predetermined time after the peak value and having a value lying between predetermined upper and lower precentages of the peak value, both of said upper and lower percentages being greater than zero, comprising means for detecting the occurrence time and magnitude of the peak value, means responsive to the detected peak magnitude value for establishing non-zero maximum and minimum threshold signals that respectively correspond with the upper and lower percentages of the detected initial peak magnitude value, means responsive to the detected initial peak magnitude value being above a threshold value for comparing the waveform magnitude with the magnitude of the threshold signals only at the predetermined time following the occurrence time of the detected initial peak value, and means responsive to the comparing means for indicating that the compared waveform magnitude falls between the magnitudes of the threshold signals.

10. The apparatus of claim 9 wherein the means for comparing includes means for comparing the waveform magnitude at a plurality of different displaced times following the occurrence time of the initial peak, and the means for indicating includes means responsive to the comparisons at at least some of the plural different displaced times.

11. The apparatus of claim 9 wherein the means for detecting the peak magnitude value includes a storage capacitor selectively connected to be charged by a voltage replica of the analog signal, and means for decoupling the storage capacitor from the voltage replica of the analog signal in response to the occurrence of the peak magnitude of the initial undulation until the waveform of the analog signal has terminated.

12. The apparatus of claim 9 further including timing means responsive to the means for detecting the peak occurrence time, said timing means including means for deriving a number of time spaced signals occurring after the detected peak, and wherein the means for comparing includes means responsive to the time spaced signals for comparing the waveform magnitude at a plurality of different displaced times following the occurrence time of the peak of the initial undulation, and the means for indicating includes means responsive to comparisons at a plurality of different displaced times.

* * * * *